Dec. 12, 1939.                J. P. MARX                2,183,296
                         TELESCOPIC BUSHING
                         Filed Dec. 19, 1938
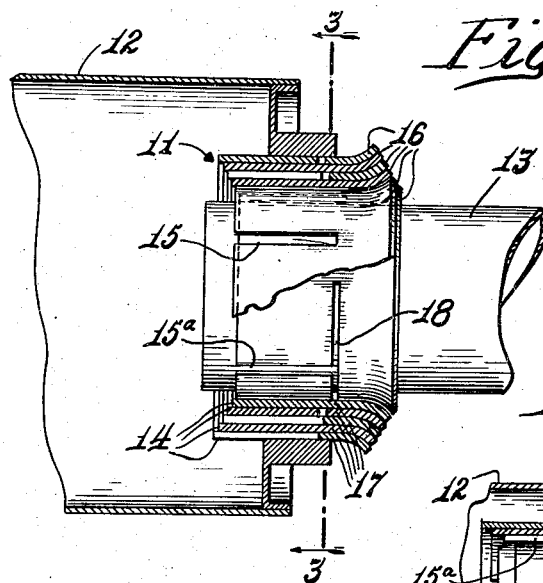
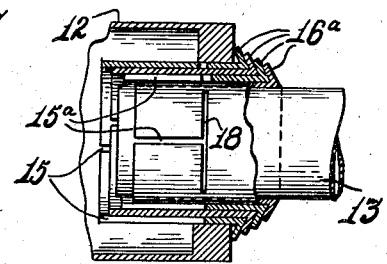
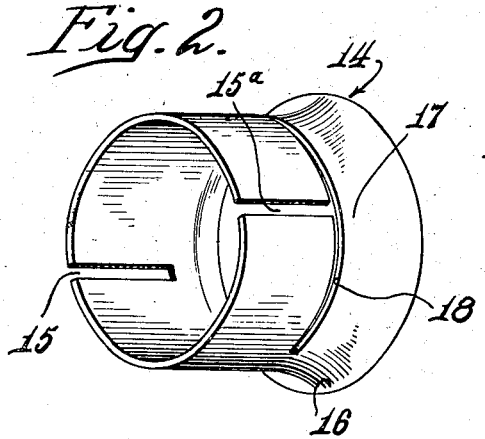
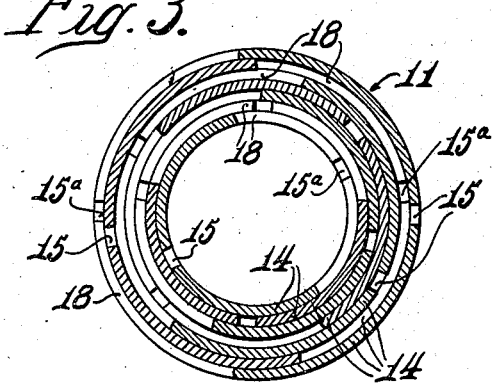
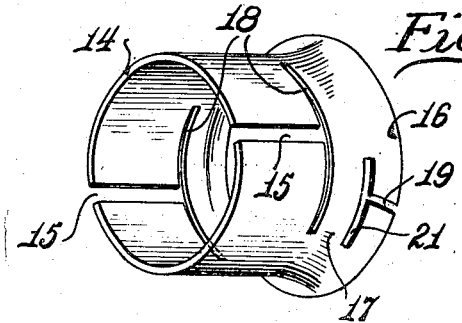
Inventor.
Joseph P. Marx.
Attorney.

Patented Dec. 12, 1939

2,183,296

UNITED STATES PATENT OFFICE 2,183,296

TELESCOPIC BUSHING

Joseph P. Marx, Hartford, Wis.

Application December 19, 1938, Serial No. 246,685

1 Claim. (Cl. 285—183)

The invention relates to bushings adapted for sealing the space between telescoping members and more particularly to a telescoped bushing consisting of a plurality of nested bands or sleeves.

An object of the invention is to provide a nested or telescoped bushing with novel means to facilitate easy assembly and to effect tight sealing.

Another object is to provide a telescoped bushing sleeve with novel structural features to afford substantially uniform contraction of a portion thereof without interrupting or disturbing the uniform continuity thereof.

The foregoing and such other objects of the invention as will appear hereinafter, will be more readily understood from a perusal of the following specification, in which reference will be made to the accompanying drawing; wherein:

Fig. 1 is a longitudinal sectional view of the telescoped bushing, showing it in use.

Fig. 2 is a perspective view of one of a plurality of substantially identical sleeves.

Fig. 3 is a sectional view taken substantially on line 3—3 of Fig. 1.

Fig. 4 is a perspective view of a sleeve embodying modified features.

Fig. 5 is a sectional view showing another form of telescoped bushing.

As best shown in Figs. 1 to 3, inclusive, the telescoped bushing indicated as a whole at 11, is intended primarily to seal the annular space between telescoping tubular members 12 and 13. Inasmuch as the amount of annular space between such members may vary in different installations, it is desirable that the bushing constitute a plurality of sleeves 14. As shown, the sleeves 14, making up a completed bushing, are made of sheet metal bands sized to telescopically nest snugly one within the other and to fit into the space between the telescoping members 12 and 13.

Obviously, to provide non-yieldable bands or sleeves would require extreme accuracy, both in the manufacture and in the fitting of the various sleeves to constitute a satisfactory complete bushing. Accordingly, it is necessary that the sleeves be made to contract but slightly when associated with each other. The ability of telescopic sheet metal sleeves to contract may be effected by splitting each band over its entire length but it is evident in such instance that escape of gases from the joint sought to be sealed will result. Contraction of the sleeves without sacrificing sealing, is accomplished in an inexpensive and practical manner as shown and described. This may be accomplished by providing each sleeve preferably with two longitudinal substantially diametrically opposite slots 15 and 15a, each of which extends inwardly from one end of said sleeve to a point short of the opposite end, which end preferably is flared outwardly as at 16. This leaves a continuous annular portion 17 adjacent said flared end.

Mere provision of the two longitudinal slots 15 and 15a however, does not adequately impart the correct flexibility, to the sleeve. It is apparent that when a sleeve is slotted longitudinally only, as above noted, each arcuate portion defined by said slots remains rigidly joined to the unslotted portion, hence any movement of said slotted portions is transmitted to the unslotted portion with the result that the latter portion is distorted slightly. This results in leakage. Substantially uniform distortion of the slotted portion, without the slightest distortion of the annular sealing portion 17 or flared portion 16, is permitted by cutting the sleeve circumferentially, as at 18, for a distance preferably less than half its circumference. The circumferential cut preferably is joined substantially midway its ends with the longitudinal slot 15a. This structure effectively provides the sleeve with a contractible portion of considerable area while the continuity of the unbroken sealing portion 17 and the flared portion 16 is not disturbed.

To assemble, one sleeve is driven into the other until the adjacent unbroken annular sealing portions 17 are in substantially alignment and the marginal flares 16 abut. Contraction of the slotted portions does not disturb the continuity or the uniform true diameter of the unslotted portions, hence a leakproof seal is provided.

In the disclosure of Fig. 4, a continuous sleeve constructed substantially like the sleeve of Fig. 2 is shown. In this embodiment, a circumferential cut 18 is provided at the inner end of each longitudinal slot 15 to increase contractibility. If desired, a similar arrangement may be provided on the flared marginal flange 16. As shown, one slot 19 extends inwardly from the flared end of the sleeve and terminates in a short circumferential cut 21 whereby the flared portion may be also contracted without disturbing the uniform annular sealing portion 17.

In Fig. 5 a structure substantially like those just described, is shown. Here each sleeve has an annular sealing flange 16a inclined inwardly longitudinally from its unslotted end to overlie a similar flange on the surrounding sleeve.

It is to be understood; that, the disclosures herein are illustrative rather than restrictive; and that, it is not desired to be limited to the precise structural details but only insofar as may be required by the present state of the art and the scope of the appended claim.

I claim:

A bushing comprising a nest of graduated telescoping sleeves adapted to seal the annular space between tubular members of different size, said sleeves having a snug surface fit, throughout substantially their full length, with either the inside or the outside of one of the other of said sleeves or with one of said members, said sleeves each having substantially diametrically opposed slots extending inwardly from one end and terminating short of the other end thereof, at least one of said slots terminating in a part-circumferential cut, the latter extending in opposite directions from said one slot, and cooperating therewith to provide for contraction of the slotted end of the sleeve, said circular cut defining one edge of an annular, substantially non-contractible sealing band portion adjacent said other end of the sleeve.

JOSEPH P. MARX.